(12) United States Patent
Misra et al.

(10) Patent No.: US 7,299,332 B1
(45) Date of Patent: Nov. 20, 2007

(54) SYSTEM AND METHOD FOR MANAGING SESSIONS AND ALLOCATING MEMORY RESOURCES USED FOR REPLICATION OF DATA IN A DATA STORAGE ENVIRONMENT

(75) Inventors: Pawan Misra, Morrisville, NC (US); Michael D. Haynes, Raleigh, NC (US); Chetan Rameshchandra Vaidya, Durham, NC (US); Somnath Gulve, Morrisville, NC (US)

(73) Assignee: EMC Corporation, Hopkinton, MA (US)

( * ) Notice: Subject to any disclaimer, the term of this patent is extended or adjusted under 35 U.S.C. 154(b) by 378 days.

(21) Appl. No.: 10/953,830

(22) Filed: Sep. 29, 2004

Related U.S. Application Data

(63) Continuation-in-part of application No. 10/877,647, filed on Jun. 25, 2004.

(51) Int. Cl.
*G06F 13/00* (2006.01)

(52) U.S. Cl. ...................................... 711/170; 711/162

(58) Field of Classification Search ................ 711/162, 711/170
See application file for complete search history.

(56) References Cited

U.S. PATENT DOCUMENTS

| | | | |
|---|---|---|---|
| 5,742,818 A * | 4/1998 | Shoroff et al. ............... | 707/200 |
| 2004/0111578 A1* | 6/2004 | Goodman et al. .......... | 711/163 |

* cited by examiner

*Primary Examiner*—Reba I. Elmore
(74) *Attorney, Agent, or Firm*—K. Gupta; R. K. Perkins; C. A. Giordano

(57) ABSTRACT

Disclosed is a system and method for managing sessions and memory resources used for replication of data in a data storage environment. The method includes the steps of determining whether a first copy session has at least a predetermined amount of memory to complete in accordance with a predetermined criterion for an amount of memory for a copy session and allowing the first copy session to complete if said memory satisfies said criterion and freeing up memory associated with the session to be allocated for another session.

14 Claims, 13 Drawing Sheets

SYSTEM AND METHOD FOR MANAGING SESSIONS AND ALLOCATING MEMORY RESOURCES USED FOR REPLICATION OF DATA IN A DATA STORAGE ENVIRONMENT

RELATED APPLICATION

This application is a continuation in part of U.S. patent application entitled, "System and Method for Allocating Memory Resources Used for Movement of Data Being Copied in a Data Storage Environment" filed on Jun. 25, 2004, assigned U.S. Ser. No. 10/877,647, and assigned to EMC Corporation the assignee of this Application, and which is hereby incorporated by reference in its entirety into this application. This Application is related to U.S. patent application Ser. No. 10/953,639, filed on Sep. 29, 2004 and entitled "System and Method for Managing Memory or Session Resources Used For Movement of Data Being Copied in a Data Storage Environment" and assigned to EMC Corporation the assignee of this application. This application is related to U.S. patent application Ser. No. 10/953,541 filed on Sep. 29, 2004 and entitled "System and Method for Managing Sessions and Reallocating Memory Resources used For Replication of Data in a Data Storage Environment" and assigned to EMC Corporation the assignee of this application.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the patent and Trademark Office patent file or records, but otherwise reserves all copyright rights whatsoever.

FIELD OF THE INVENTION

This application generally relates to data storage management, and more particularly to managing sessions and allocating memory resources used for replication of data in a data storage environment.

BACKGROUND

Computer systems may include different resources used by one or more host processors. Resources and host processors in a computer system may be interconnected by one or more communication connections. These resources may include, for example, data storage systems, such as the Symmetrix™ or Clariion™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data through the channels to the storage device and storage device provides data to the host systems also through the channels. The host systems do not address the disk drives of the storage device directly, but rather, access what appears to the host systems as a plurality of logical disk units. The logical disk units may correspond to the actual disk drives. Allowing multiple host systems to access the single storage device unit allows the host systems to share data stored therein.

It is desirable to copy or replicate data for a variety of different reasons, such as, for example, database-related data may be critical to a business so it is important to make sure it is not lost due to problems with the computer systems, such as for example, loss of electrical power. However, there are costs associated with backing up or otherwise copying or replicating data. Such costs include the data being unavailable to an application that may require access to it. For example, in a normal business operation, not as a production environment, data may be needed for an update or in relation to a transaction on a close to full-time (i.e. 24 hours a day, 7 days a week) basis. Another cost is the allocation of resources for managing such copying, e.g. memory or session resources that are expensive in terms of the resource itself but which may be costly to manage because of the expertise needed for such management. What is needed is a low-cost simple way to manage resources in a data storage environment and in particular one that supports such copying and replication as that described above.

SUMMARY OF THE INVENTION

To overcome the problems of the prior art mentioned above and to provide advantages also described above, this invention is a system and method managing sessions and memory resources used for replication of data in a data storage environment. In one embodiment, a methodology is provided for inspecting a plurality of copy sessions forming a copy session group operating in the data storage environment to determine the size and number of buffers each session is using; and determining whether to abort a session of the group and reallocate its buffers for another session based on the inspection. In other embodiments, implementations include a system, a computer program product, or an apparatus, wherein each embodiment is configured for carrying out the steps involved in the methodology.

BRIEF DESCRIPTION OF THE DRAWING

The above and further advantages of the present invention may be better under stood by referring to the following description taken into conjunction with the accompanying drawings in which.

DETAILED DESCRIPTION OF THE PREFERRED EMBODIMENTS

Introduction

Figure 1:
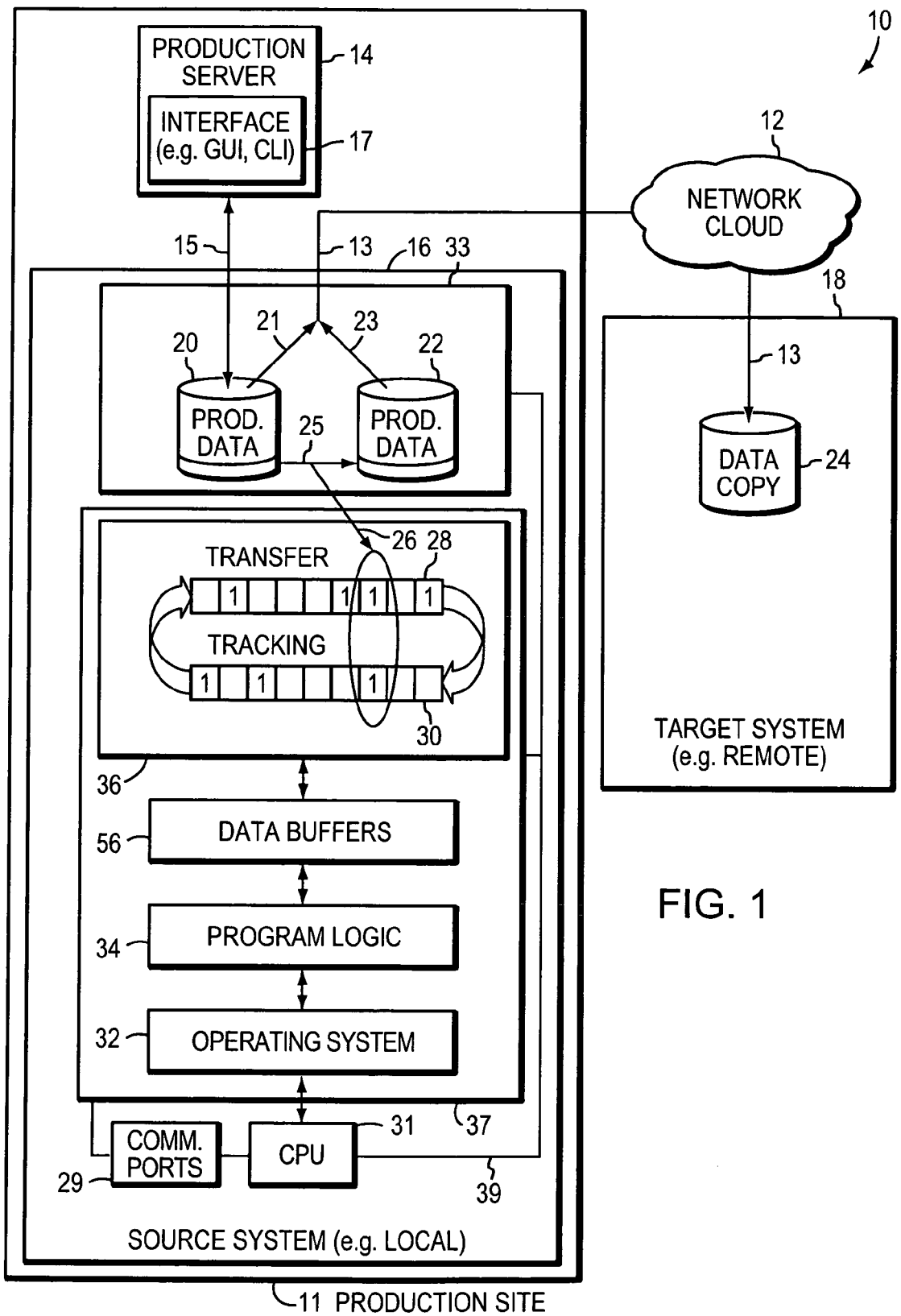
FIG. 1 shows a block diagram schematic of an embodiment of a data storage environment including one or more data storage systems and including a Production Site and further including program logic for carrying out the method embodiments of the present invention.

In the preferred embodiment, the preferred invention operates in cooperation and may be a part of computer software, such EMC Corporation's SAN Copy software. SAN Copy is configured for allowing movement of data between data storage systems, e.g. the preferred EMC CLARiiON and Symmetrix storage systems available from EMC Corporation of Hopkinton, Mass., although one skilled in the art will recognize that the invention may be used with other data storage systems. Preferably, SAN Copy is a storage-based implementation to remove impact from a server which may be hosting application software in a production environment.

Typically, SAN Copy operates in cooperation, with EMC's TimeFinder and SnapView local replication applications, eliminating the impact to production activities by using Business Continuance Volumes (BCV's) (discussed in the incorporated '497 patent referenced below) or Snapshots as source volumes so applications stay online throughout the data movement process. However, the present invention may be used without requirement of such BCV's or Snapshots. For the sake of completeness, operational features embodied in EMC's Timefinder and Symmetrix are described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

SAN Copy is an embodiment of an array to array copy technology and can also copy within the array itself. Data is transferred from a source array to a remote destination array with no attached server involvement pertaining to the data movement (strictly storage array to array data communication). Incremental SAN Copy is an enhancement to the SAN Copy product offered by EMC Corporation which allows customers to update data on remote arrays by sending only the modified data since the last time an incremental update had occurred.

Snapview is other software available from EMC Corporation and which embodies important features of the present invention. SnapView embodies the invention which supports an incremental copy feature, by employing a session as a tracking mechanism to track the changes for an Incremental Copy Session and to maintain the consistency of a changing data image during the life of the data copy. The inventors have critically recognized that such a mechanism may be employed to advantageously minimize the performance impact of accessing production data for copying or replication.

With regard to some terminology in this application, it will be helpful to discuss some terms, shown in Table 1.

TABLE 1

| Terminology |
|---|
| COFW: copy on first write. Mechanism for maintaining a pointer based point in time copy of data. The COFW policy insures the original version of data is saved before allowing the data to be modified. |
| Incremental SAN Copy (ISC): a feature that provides users with the ability to perform incremental updates to copies of their production data. These copies can reside on the same array as the production data, or on remote arrays. The data transfer is array-to-array without server involvement. ISC is an extension to the SAN Copy product. |
| Incremental SnapView Session: a special SnapView Session that is created specifically for an ISC Session. These sessions are used to track which data areas of the source data are modified as well as protect the user selected point-in-time copy of the data while an incremental copy is in progress. |
| Delta Bitmap: data structure in SnapView that is used to track changes in granularities between 2 KB and 64 KB for an incremental SnapView session. The delta bitmap consists of two parts. |

| |
|---|
| Tracking Bitmap - part of the delta bitmap that is currently tracking changes. The changes that are tracked do not result in a COFW. |
| Transfer Bitmap - The part of the delta bitmap that is used by the Incremental SnapView Session to provide SAN Copy with The data to be copied. It represents the changes from the last copy operation to the most recent "mark" operation. |
| Chunk: A chunk is a contiguous piece of data, which will be returned by SnapView in a GetNext buffer. Several chunks could be returned in a GetNext buffer. |
| GetNext: This is a private interface between SAN Copy and SnapView to read the data |
| Available Link Bandwidth (BW): This is the bandwidth available to SAN Copy for a given session. It is specified by the user and may be less than the actual bandwidth of the link. |
| Effective Bandwidth: This is the bandwidth that a SAN Copy Session is utilizing. |
| High Bandwidth Line: For the purpose of this document a specified bandwidth that is equal to or greater than the bandwidth of an OC3 line is considered a high bandwidth line. |
| Low Latency: For the purpose of this document latency of 1 msec or less is considered a low latency. |
| Link Latency (LL): This is the amount of time it takes to transmit a block of data to its destination. |
| Line Capacity (Lcap): This is the amount of data required to completely fill a line end to end for a given bandwidth and latency. |
| Line Capacity = Available Link Bandwidth * Link Latency |
| Granularity: This is the chunk size of the changes being tracked on the source LU. |
| Buffer Space: This is the total amount of memory allocated to hold the Getnext data. |
| Buffer Space = Buffer Size * Buffer Count. |

Overview of a Preferred Embodiment

In a preferred embodiment, Program Logic cooperates with and may include EMC Incremental SAN Copy features that use the EMC SAN Copy and EMC SnapView program code and may also receive instructions from users through the GUI or CLI, or through dynamically linked other programs. One skilled in the art will recognize that the invention is not limited to such preferred embodiments; however, they are described herein as an example of implementing the invention. Returning to an exemplary embodiment overview, the user can specify the point-in-time copy of the data to be transferred to the remote arrays by "marking" the data via an administrative command. Any time after the data has been "marked"; the user can initiate the SAN Copy transfer of the data to one or more remote arrays. After an initial full copy, subsequent copies will only copy portions of the production data that changed since the previous copy. Preferably, the communication and user input is provided by using some type of Administration program, e.g. EMC's Navisphere CLI or GUI product.

Preferred Embodiment Description

Referring to FIG. 1, Data Storage Environment 10 includes a Production Server 14 with an Interface 17 (e.g. a graphical user interface a.k.a. GUI or command line interface a.k.a. CLI) for communicating with Local Data Storage System 16 across path 15, and in particular for accessing Production Data 20, wherein Production Data Copy 22 is typically COFW data made for consistency and indicated along copy path 25, and wherein tracking actions along path 26 will be discussed below. The Production Data 20 is updated by write requests along path 15 in Server I/O, which results in regions of modified storage tracked by a tracking session 36. An incremental tracking session 36 on the Data Storage System 16 supports an incremental copy feature, such as the preferred Incremental SAN Copy feature available from EMC Corporation. For convenience, reference is made herein to a Production Site 11, which comprises the Production Server 14 and Local System 16.

The Data Storage System 16 may be considered a Source or Local system and replication, backup, or other copying may be performed to a Target or Remote system. The term remote as used herein means being on a different storage system, although this invention is applicable to source and target systems that actually are the same system but the data is sent to a different storage device or even a different location on the same storage device in the same system. For purposes of this invention it is sufficient to understand that the Remote System has storage devices (e.g. hard drives) that may function to duplicate or simulate some or all of the Local System on a volume-by-volume basis and that the volumes can be physical volumes, although logical volumes are preferred. Devices and volumes in a logical sense are also used interchangeably throughout. Note also that throughout this document, like symbols and identical numbers represent like and identical elements in the Figures. With further regard to terminology, copying is used throughout to generally refer to any way of duplicating data that is stored in one storage location (e.g. Production Data on the Source or Local System) to another storage location (e.g. Data Copy on the Target or Remote System) for any reason including, replication, backup, restore, or general mirroring. Although the invention is particularly useful in an environment employing a local and remote data storage system, it will become apparent upon reading this specification that the invention is also useful in a local system itself using copying or replication to a local volume.

Generally, such a data storage system as those described herein includes a system memory and sets or pluralities of multiple data storage devices. The system memory can comprise a buffer or cache memory; the storage devices in the pluralities can comprise disk storage devices, optical storage devices and the like. However, in a preferred embodiment the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to the preferred data storage system, the host or host network is sometimes referred to as the front end and from the disk adapters toward the disks is sometimes referred to as the back end, and ports communicating from a data storage system toward each respective end are termed, respectively, front end ports and back end ports. Also disks may be addressed logically using logical volumes also known as logical units also interchangeably referred to many who are skilled in the data storage computer arts as either LU's or LUN's, wherein the LU's or LUN's represent volumes of physical data on data storage devices such as disks. Mapping is used between such LUN's and physical data to achieve the representation. A bus interconnects the system memory, and communications with front and back end.

In a preferred embodiment the tracking session 36 is part of EMC's SAN COPY or Snapview product, or follow on products including Mirrorview and Mirrorview Asynchronous (also known as Mirrorview-A) and preferably includes: (1) maintenance of two data structures, which for purposes of simple explanation are shown as bitmaps (but one skilled in the art will recognize that the invention is not limited to a specific data structure such as bitmaps), transfer bitmap 28 and tracking bitmap 30 for tracking incremental changes to the production data (the roles of the transfer and tracking bitmaps switch whenever a session is marked); (2) the ability to mark and unmark a point in time associated with a session; (3) reduced COFW overhead on access to Production Data 20 and 22, preferably in non-volatile memory 33, such as a computer hard drive, including: (a) No COFWs unless the session is marked; (b) COFWs only occur if the data had been marked to be copied in the transfer bitmap; and (c) the probability of having to perform a COFW diminishes while an ISC is in progress.

Generally, in a preferred embodiment the two bitmaps are used by the Program Logic 34 in cooperation with the operating system 32, and the CPU 31 on the source data storage system 16. The bitmaps and Program logic operate in electronic memory 37 and when executed by CPU 31 over communication path 39 carry out method steps embodying the invention. It is preferred that the Program Logic be computer software although it may be possible for some or all of it to be embodied in hardware or firmware. The Program Logic 34 (FIGS. 1 and 10) in a preferred embodiment encompasses at least in part the integration of EMC's Snapview with Incremental SAN Copy and further with EMC's Mirrorview-Asynchronous product, each available from EMC of Hopkinton, Mass., USA. Data protected by this mechanism may span storage processors in the storage array.

Figure 13:
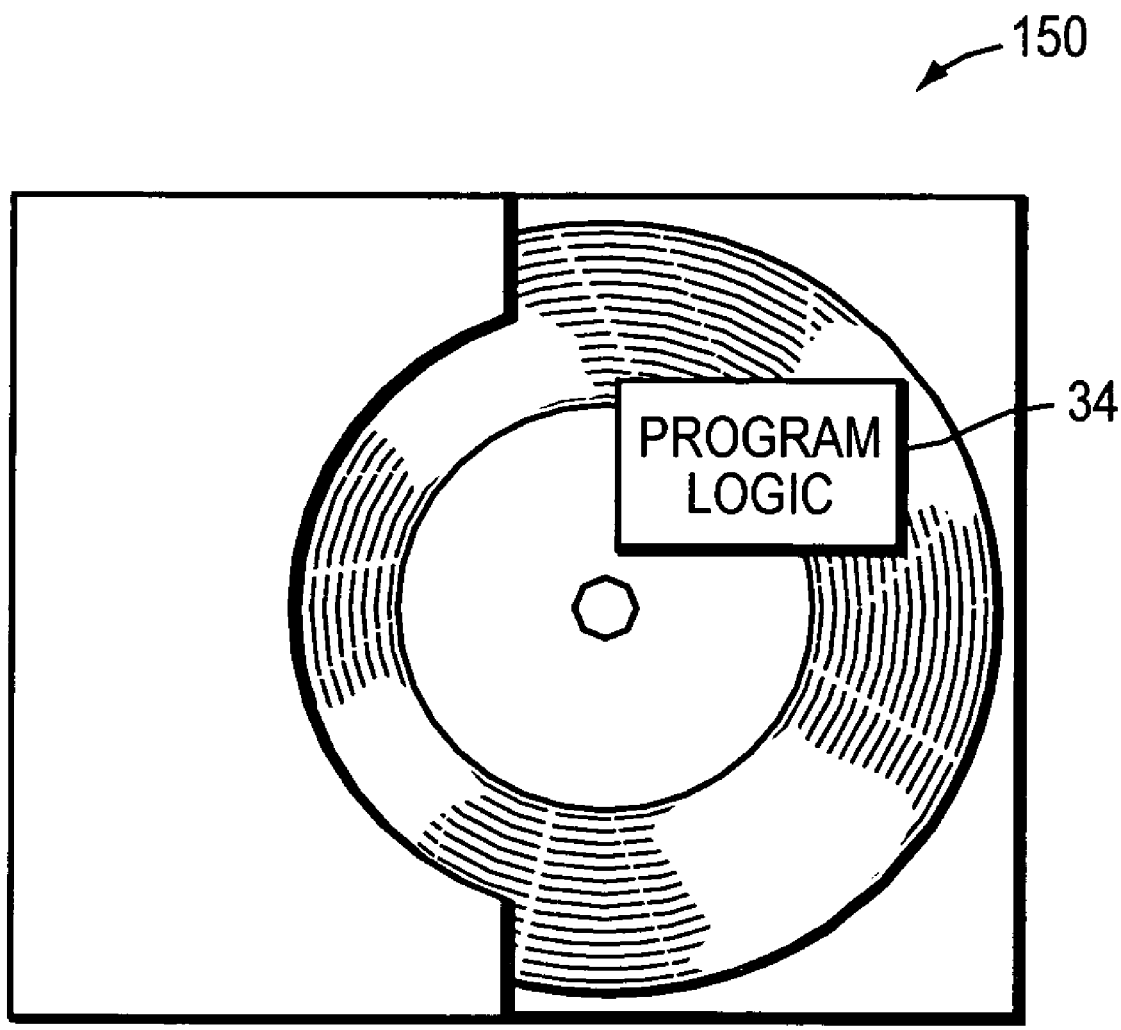
FIG. 13 shows a computer-readable medium including computer-executable code including at least some of the program logic of FIG. 1 for carrying out method steps of the method embodiments of the present invention.

Program Logic 34 may also be embodied on a computer-readable medium 150 as shown in FIG. 13, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Preferably, during the life of an Incremental Session, these two bitmaps swap their roles after a mark operation. After a session is marked, a COFW will be performed only if the transfer bitmap (which was the tracking bitmap before the mark) indicates that the specific region of the data is yet to be copied via ISC. Further, as the data is copied, the regions corresponding to the data transferred in the transfer bitmap are cleared which further reduces the amount of COFW activity needed. As the transfer proceeds, the probability of having to perform a COFW diminishes. These optimizations may significantly reduce the number of COFWs necessary to maintain a consistent copy of the production data and are an improvement of prior art systems that may include known pointer-based snapshot technologies.

Referring again to FIG. 1, Production Data 20, as it pertains to this invention, exists in two states: marked and unmarked. All write requests to Production Data, that has an incremental session associated with it, are tracked (i.e., records of regions on the storage where the change occurred is maintained in the tracking bitmap). Prior to making an incremental copy to Data Copy 24 on a Target or Remote Data Storage System or Storage Array 18, over a network cloud 12, which may be for example a wide area network, the state of the data is transitioned to indicate marked. Then in a preferred embodiment, the tracking bitmap becomes the transfer bitmap and a cleared transfer bitmap is used as the tracking bitmap. Thus, the role of the tracking and transfer bitmaps will switch each time data is marked. This switching of roles should be atomic in nature with respect to Production Server 14 writes to the Production Data 20. Changes to the Production Data since the last incremental copy are copied to one or more remote arrays only when the data is in the marked state. As soon as an incremental copy is completed the state of the production data is reverted to unmarked by the Program Logic 34.

The ISC process will transfer the regions indicated in the transfer bitmap. While the production data is being transferred, new server write requests are tracked for the next transfer. If a server write request is destined to modify a region that is going to be transferred (the transfer bitmap indicates that region is to be transferred), the data at the time of the mark needs to be preserved. The preferred incremental SnapView will perform a COFW of the region before the server write request is allowed to proceed. The ISC transfer, when it gets to the region that had a COFW performed upon it, will transfer the data that has been saved via the COFW. After a region has been transferred via ISC, the region in the transfer bitmap is cleared. This will reduce the probability of having to perform a COFW as the ISC proceeds. A COFW should be performed if the region indicated in the transfer bitmap is being overwritten before the regions have been transferred to the remote array or the resultant data copy will be inconsistent. This is represented by copy path 25 indicating a COFW from Production Data 20 to Production Data Copy 22. Along Path 26, changes to the transfer and tracking bit maps indicate the state of data that may be later transferred to Data Copy 24. Along path 21 and 23, data regions marked by the transfer bit map from either the Production Data or COFW Production Data Copy are sent over path or link 13 through Network Cloud 12 to Data Copy 24 on the Target 18. One skilled in the art will recognize that the Data Copy 24 could also reside on the same array or data storage system as the Production Data, but there are advantages related to availability of data in sending it to another system.

FIG. 1 also shows data buffers 56 that are memory resources for data transfer between the source and target system that are managed by components of the program logic 34, and specifically a copy manager driver that will be discussed below in detail, and in relationship to the communication (comm.) ports 29 of the source system. The comm. ports include front end and back end ports that are also discussed herein.

Copy Manager Embodiment

Figure 2:
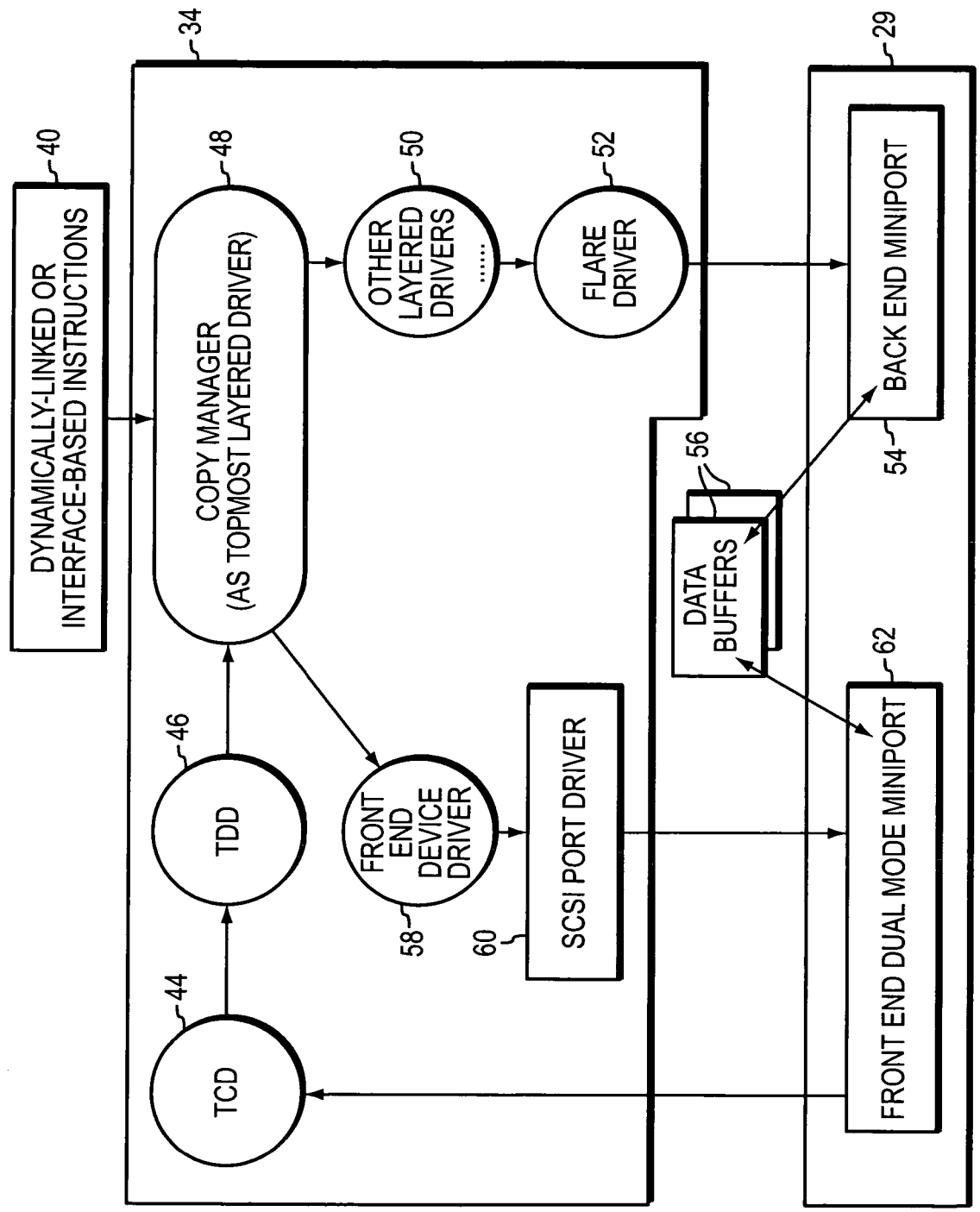
FIG. 2 shows another schematic block diagram including a depiction of functional relationships of components of the program logic of FIG. 1 and acting on data of the one or more data storage systems of FIG. 1.

Referring to FIG. 2, an embodiment of program logic 34 that includes a copy manager 42 that manages data buffers 56 that are part of memory 37 (FIG. 1) and bandwidth utilization of data transfer over link 13 for copying and replication. The Copy Manager 42, in a preferred embodiment, is part of the Program Logic software that operates in the preferred Clariion Data Storage System from EMC and operates as and communicates with software drivers that are also part of the Program Logic in the preferred Clariion. Such drivers include, in a preferred embodiment, the Target Class Driver 44 and Target Disk Driver 46 (TCD/TDD) that comprise a driver layer provides SCSI Target support in communication with the Copy Manager and the front end dual mode miniport 62 that is part of communication ports 29 (FIG. 1). These drivers handle SCSI reads and writes as well as SCSI commands (such as INQUIRY, REPORT_LUNS, and so forth).

The TCD/TDD Layer also implements support for the preferred CLARiiON functionality which provides the means of identifying what LUNs each initiator should see. This is known as LUN masking. The feature also provides for LUN mapping whereby the host visible LUN is translated to an instance-based LUN. The Copy Manager copies data between LUNs (front end or back end). The Copy Manager receives instruction from I/O controls through a DLL (not shown) or indirectly through a user interface-based instruction shown in functional block 40. One of the functions of the Copy Manager is to copy data from a source LUN to a target LUN, but this function allows the Copy Manager to be used in a new way for both resource, session and performance management. To initiate a copy, the Copy Manager issues some number of SCSI read requests to the source LUN. On completion of each read, the Driver writes the data to the destination LUNs. The process repeats until all data is copied.

When one of the LUNs is a front end device the Driver issues I/Os by issuing SCSI reads or writes via the front end, e.g. via a fibre channel front end in a preferred embodiment. Local LUNs are accessed by sending I/O request packets down the disk driver stack, beginning with whatever driver is attached immediately below the TDD driver, i.e. the topmost layered driver 48 and other layered drivers 50 that communicate in the driver stack within the preferred operating system driver, which operates in cooperation with the Flare Driver 52 of the Clariion data storage system in a preferred embodiment.

The Copy Manager Driver fits in with a collection of Drivers as shown in FIG. 2. The front end Device Driver 58 provides support for sending initiator-mode I/O requests to the standard SCSI Port Driver 60, which in turn communicates with the front end miniport. The data buffers 56 are allocated by the Copy Manager Driver 42, and are used by the front end miniport driver 62 and backend miniport driver 54. The backend miniport DMA's data into a Flare-owned buffer and Flare copies the data into a buffer allocated by the Copy Manager Driver.

Figure 3:
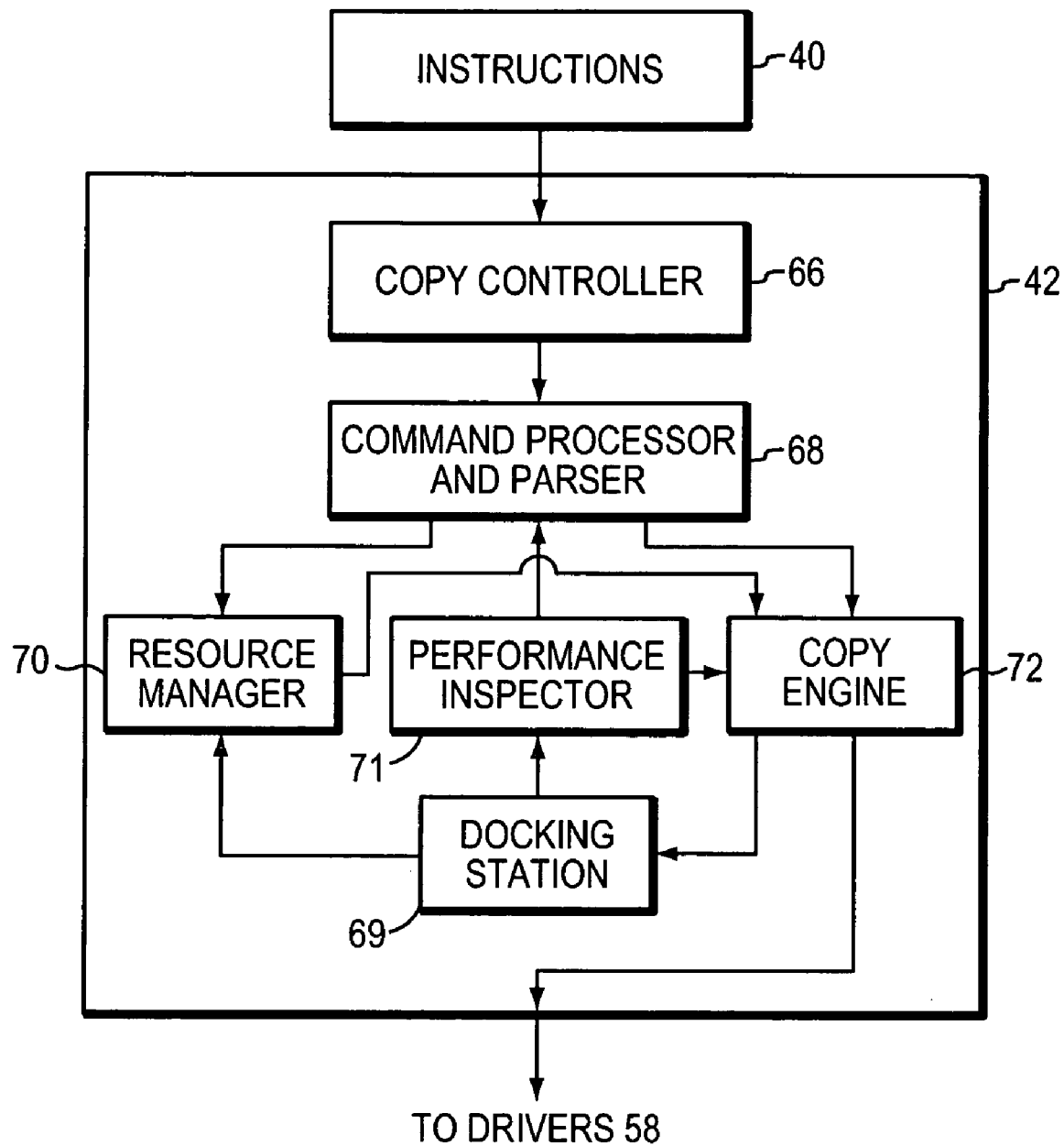
FIG. 3 shows a schematic block diagram of components of the copy manager depicted in FIG. 2.

FIG. 3 illustrates the Copy Manager Driver 42 in more detail and describes its functional components. The Copy Controller 66 has responsibility for handling incoming instructions from user space. The Copy Controller also implements the Driver Entry function, which initializes the Driver and creates the Copy Manager's device object, to which the instructions are directed. The primary control instruction of interest is the one that initiates a data copy. Additional control instructions verify access to prospective copy targets, control the operation of active copy commands, and return status. The Copy Controller preferably supports any required administrative control including those related to modifying the driver stack. It may also contain considerable portions of code related to implementation of operations such as checkpoint, pause, and resume, as convenient to the lower-level implementation.

Referring again to FIG. 3, the Copy Manager also includes a Command Processor and Parser 68. The command parser is intended to accept SCSI copy commands such as the Extended Copy Command and other Copy Commands that may be native to a particular data storage system, such as the preferred Clariion, and with the preferred SAN Copy, Snapview, and/or Mirrorview Asynchronous program code may include Complex, or Simple Copy Commands, and puts the respective commands onto one or more "streams" of input to the Command Processor. All streams can be handled simultaneously by both the Command Processor and the Copy Engine. All commands within a stream are handled in first in first out (FIFO) order. The Command Parser puts all commands associated with a single Extended Copy Command in the same stream. Complex and Simple commands can be intermixed with Extended Copy Commands, but all Commands associated with a single Extended Copy Command must be contiguous and in the same stream in the preferred embodiment. The Parser may use some intelligence in deciding which incoming commands are assigned to which stream.

The Command Processor accepts streams of Complex and Simple Copy Commands from the Command Parser. At any point in time, it is simultaneously working on all commands at the head of each stream's queue. For each new command, the Processor performs all initial setup associated with that command, such as requests to the Resource Manager 70 for buffers, establishing existence of copy targets, if necessary and conversion of any target descriptors to device objects. Several of these items involve communication with the appropriate front end Device Driver 58. In particular, the Device Drivers may create Device Objects corresponding to the Copy Targets. The Command Processor asks the appropriate front end Device Drivers to create Device Objects for use by the Copy Engine 72 in a typical Windows Operating environment.

In the preferred embodiment, local devices belong to the Flare Driver 52, so the Copy Manager must be attached to the appropriate Disk Driver stack. Attachment will be made so any Mirroring or Snap operations will be supported. The Processor will issue an upcall to the DLL to set up the stack. It will then open the Device Objects and pass the Device Object pointers to the Copy Engine as part of the Primitive Copy Command. When the Copy Engine completes a command, it returns status to the Command Processor, which performs any final cleanup and completes the request (status may include an error). Final cleanup may include additional commands to the Device Drivers.

A Performance Inspector 71 is also part of the Copy Manager. It inspects all copy sessions running in the copy engine and alerts the Command Processor to assist in managing memory and session resources, and its function is discussed in more detail with reference to FIGS. 8 and 9.

A Docking Station 69 (FIG. 3) is also a component of the Copy Manager. It is the holding area where all the completed sessions are put by the Copy Engine. The Docking Station is responsible for invoking the post processing of the copy sessions, and its function is discussed in greater detail with reference to FIGS. 8 and 9.

Figure 4:
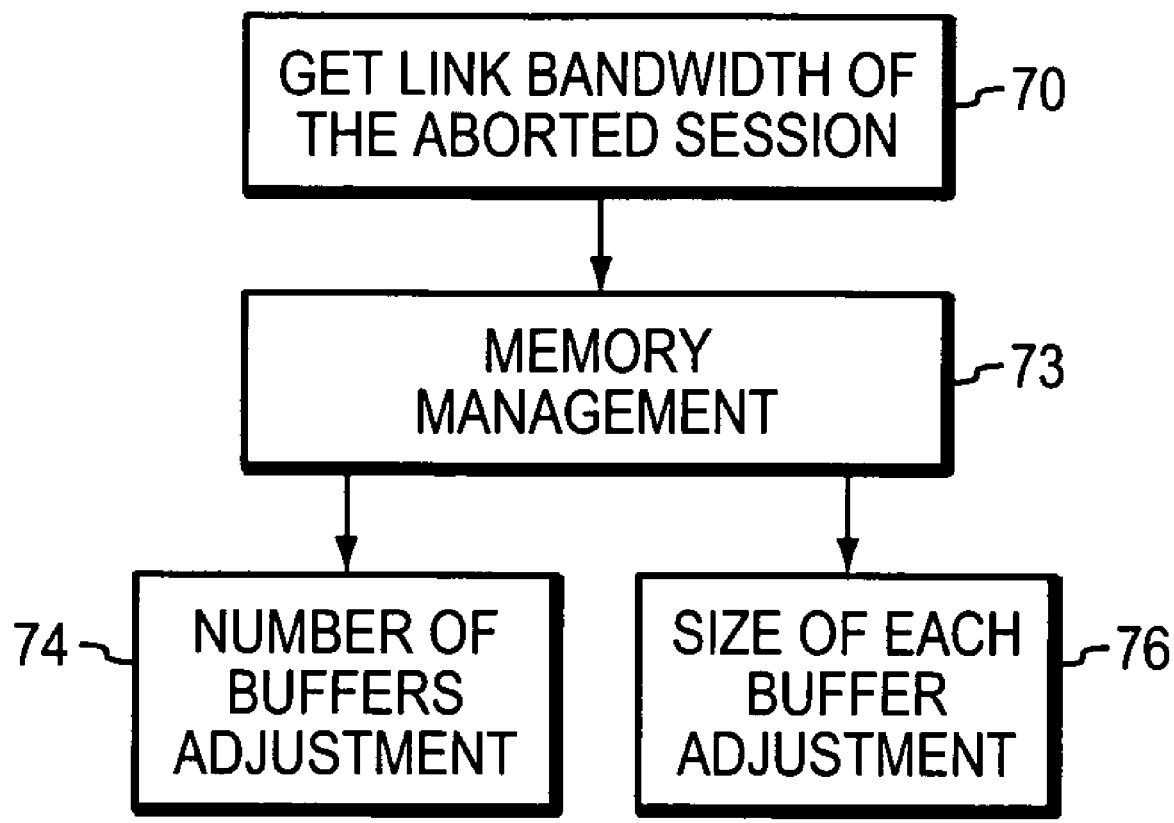
FIG. 4 shows a schematic of functions carried out by the copy manager depicted in FIGS. 2 and 3.

Referring to FIG. 4, memory management is further described. Based on user input received bandwidth is provided by the DLL in a preferred embodiment in step 70. Memory Management is generally carried out in step 73 (described in more detail beginning with reference to FIG. 5), and number and size of buffers is adjusted accordingly in respective steps 74 and 76.

Generally, before sending a command to the Copy Engine, the Command Processor requests buffers from the Resource Manager. Since the Command Processor understands the characteristics of the devices involved in the copy command (generally important only for stream devices, where blocking factors may be specified in the Complex Copy Command) it must have the opportunity to specify the buffer size and maximum number of buffers. If it does not specify these parameters, the Resource Manager will choose them.

The number of buffers and buffer size and granularity of tracking determine the number of I/Os the Copy Engine can have outstanding at a time, so the Resource Manager may apply some intelligence in determining the number of buffers, to keep I/Os pipelined. It may also apply intelligence to the choice of buffer size, for efficiency and throughput. Each Copy Command stream will have its own set of buffers, so the Resource Manager must track them separately, and make them available to the Copy Engine on a per-stream basis. When a buffer request is made, the Resource Manager also allocates an I/O request packet (IRP) for each buffer in the preferred embodiment. The Copy Engine will use this IRP to issue Read/Write requests associated with the buffer. When the Command Processor empties a Command Stream's queue, it should notify the Resource Manager to free all associated buffers and IRP's (the use of IRP' is incidental to operating in a Windows environment and one skilled in the art will recognize it does not limit the scope of the invention).

The Copy Engine accepts Primitive Copy Commands from the Command Processor, and performs all reads and writes necessary to implement each command. The Primitive Copy Commands contain source and destination devices described as Device Objects. They may represent local devices which are part of the Disk Driver Stack. The Read/Write IRP's will be identical, whether sent to the local stack or to the Front end Device Drivers. The Copy Engine supports multiple streams of copy commands. Each stream is operated on independently, allowing individual pause, resume, and throttling. The maximum number of streams is decided at compile time and well known to both the Command Processor and Copy Engine.

The Command Processor also provides some indication to the Copy Engine as to where the buffers are located. They have been pre-allocated by the Resource Manager, through negotiation with the Command Processor. The indication of their location may simply be the Stream Number from which the Copy Engine acquired the command.

Figure 5:
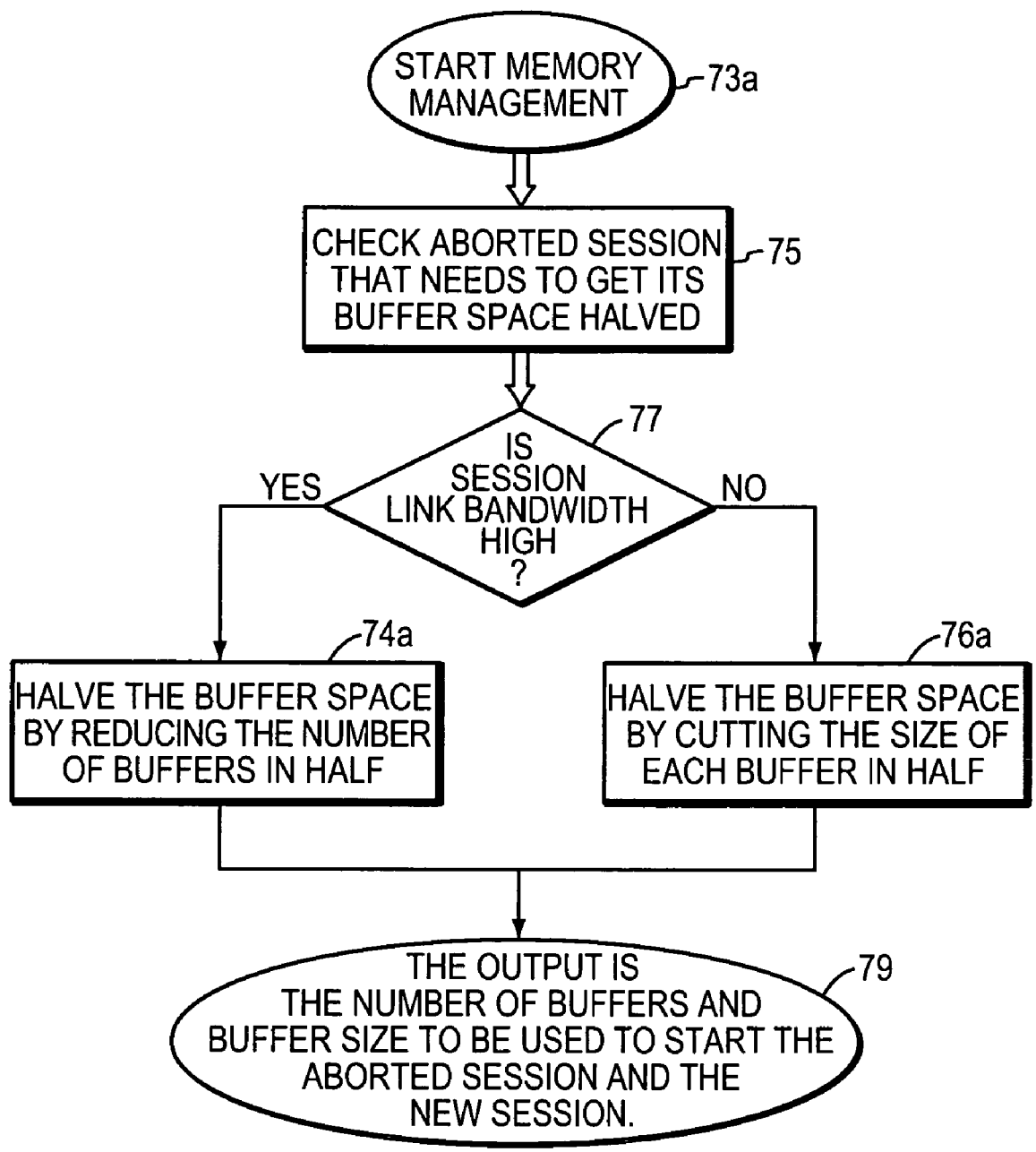
FIG. 5 shows a schematic of a memory management function carried out by the copy manager.

Referring to FIG. 5, the memory management referenced in FIG. 4 is now further described, and may involve some specific functionality that could differ from a general case described above. In step 73*a*, memory management is begun. When the driver cannot get enough memory to start a new replication session, e.g. a Mirrorview Asynchronous session in the preferred embodiment it aborts an executing session to free up some memory. Once the session has been aborted, the driver will reduce its memory in half so the new session can get half of this memory to operate with. Halving the memory can be done either by reducing the number of buffers, or keeping the number of buffers the same and reducing the size of each buffer. The following method is used to decide which halving method to use. In an overview perspective, if the session is using a high bandwidth line the driver will cut the number of buffers into half. If the copy is running with the minimum number of buffers then the driver will cut the buffer size into half. If the session is using a low bandwidth line the driver will cut the buffer size into half. If the copy was running with the minimum buffer size then the number of buffers will be reduced to half.

These steps are described with reference to steps shown in FIG. 5 for the sake of clarity. In a case where a session has been aborted due to insufficient memory that session is checked in step 75 to determine its link bandwidth. If the bandwidth is sufficiently high then in step 74*a* the memory is halved by reducing the number of buffers in half (generally, a specified bandwidth that is equal to or greater than the bandwidth of an OC3 line is considered a high bandwidth line). But if the bandwidth does not meet the predetermined bandwidth criteria in step 77, then the memory is halved by cutting the size of each buffer in half instead. In step 79, the output is the number of buffers and buffer size to be used to start both the aborted as well as the new session.

Figure 6:
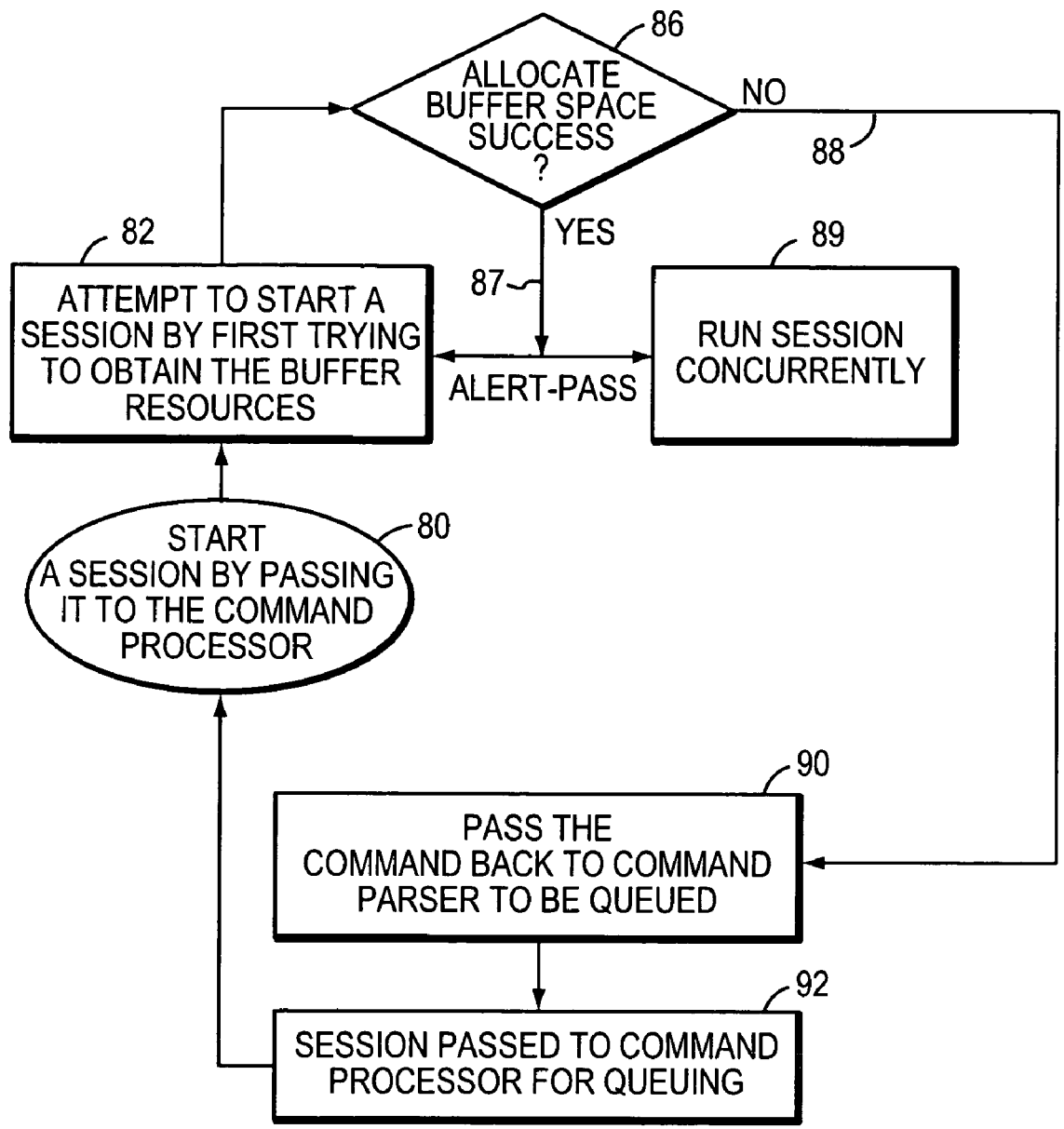
FIG. 6 shows a flow logic diagram of steps for carrying out method embodiments of the present invention employed by the copy manager.

Referring now to FIG. 6, a method of managing a low memory contingency is described. From an overview perspective, the inventors have recognized that memory limitations may be managed to handle session needs in replication and an example is shown in the preferred Mirrorview Asynchronous (Mirrorview/A) environment, but is not limited to such an environment. In order to support a number of concurrent sessions, e.g. the case of Mirrorview/A that supports concurrently 100 mirror sessions, a minimum amount of memory is required. For example, 8 MB. If there is less than 8 MB on the SP, then the copy manager driver on behalf of Mirrorview/A will give the minimum allocation amount to as many Mirrorview/A mirrors (sessions) as possible (<100) and will queue the rest. Steps for carrying this out are now described.

Figure 7:
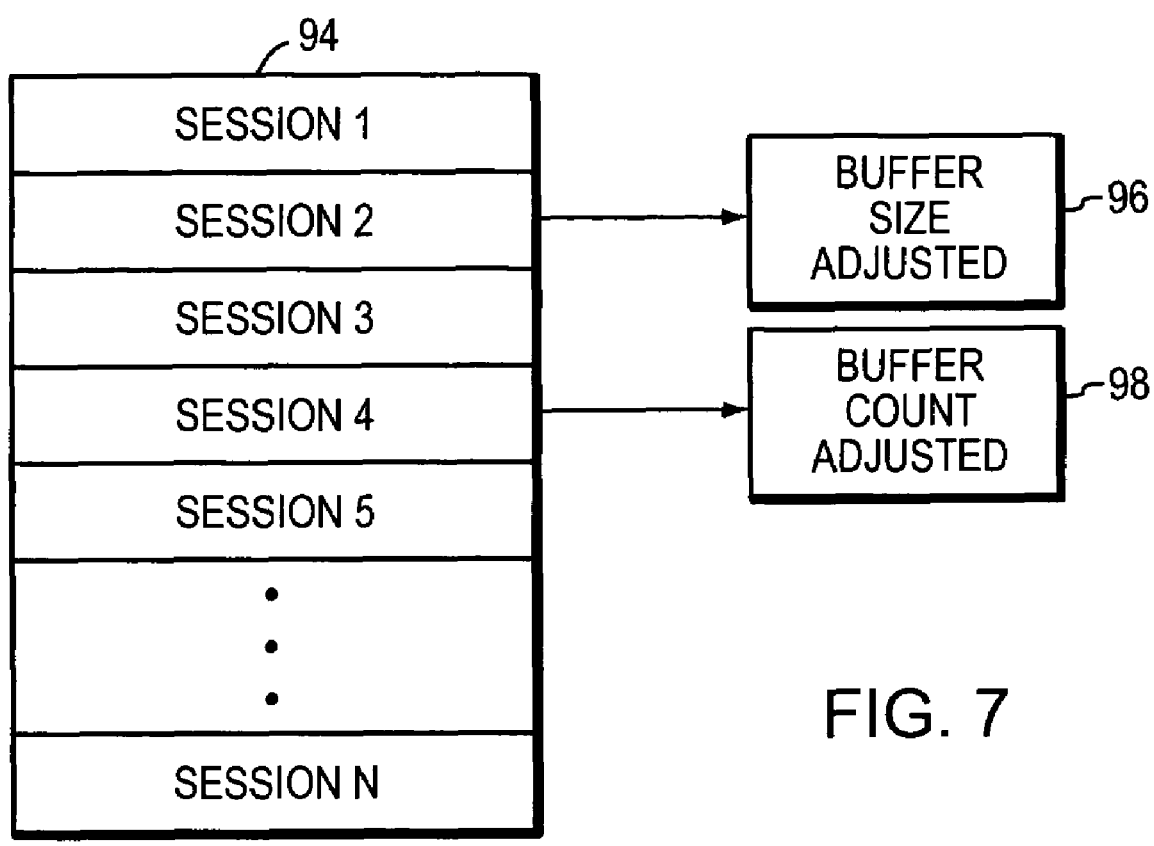
FIG. 7 shows an aspect of session management carried about by one or more components of the copy manager.

Reference is made below to FIGS. 5-7. In FIG. 6, a session is started by the Command Parser passing it to the Command processor (step 80). In step 82, the command processor tries to obtain buffer resources by requesting the resource manager for resources. Either, the resources will be obtained or they cannot be obtained as there is no memory available in the storage processor and this will determine whether the allocation of buffer resource is successful (step 86). If yes, the sessions are run concurrently in step 89, and alert 87 is passed to the Command Processor. If no, then this session is sent to the command parser to be queued in step 90, and the session is queued in step 92. The queued sessions are passed back to the Command Processor and general processing begins at step 80 as the queue is emptied and resources are allocated, until all sessions are completed. FIG. 7 shows a general allocation of running concurrent sessions 1-N, wherein either buffer size or count is adjusted in general accordance with methodology described above with reference to FIGS. 5 and 6.

Figure 8:
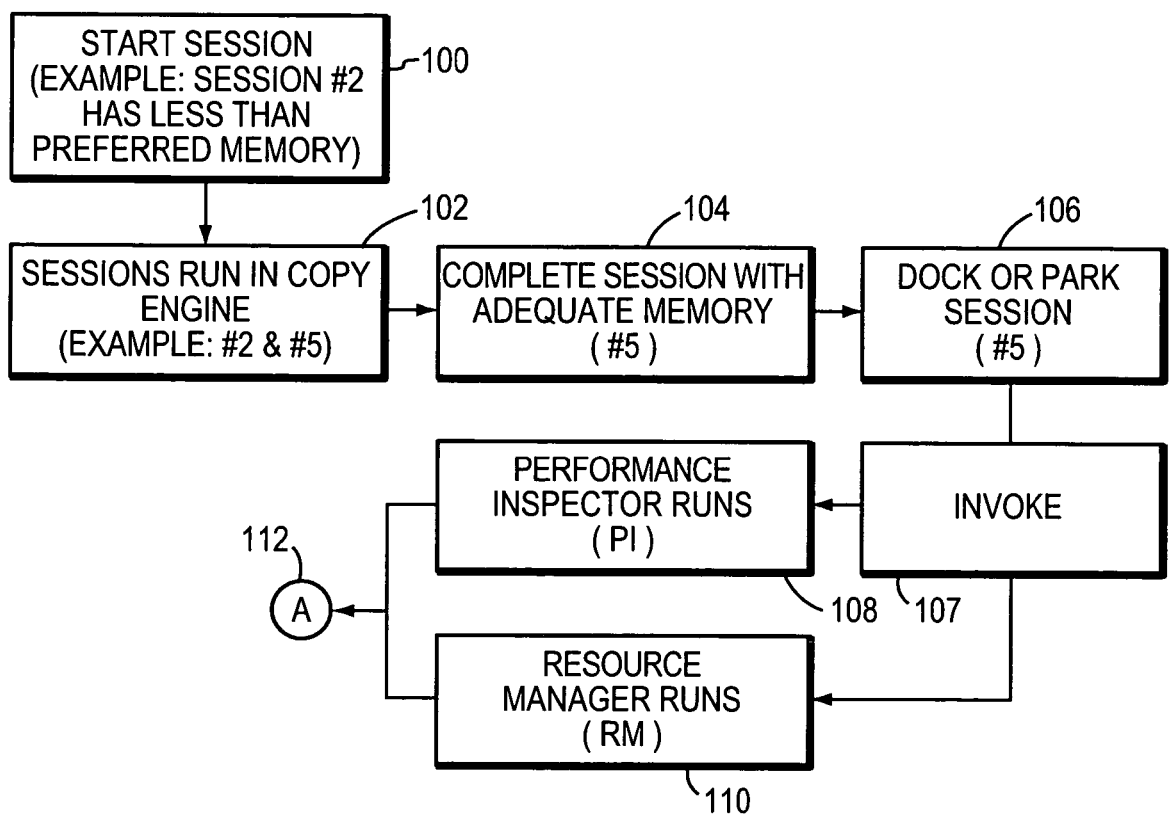
FIG. 8 shows an example of an embodiment of a performance improvement method carried about by one or more components of the copy manager shown in FIG. 2.
Figure 9:
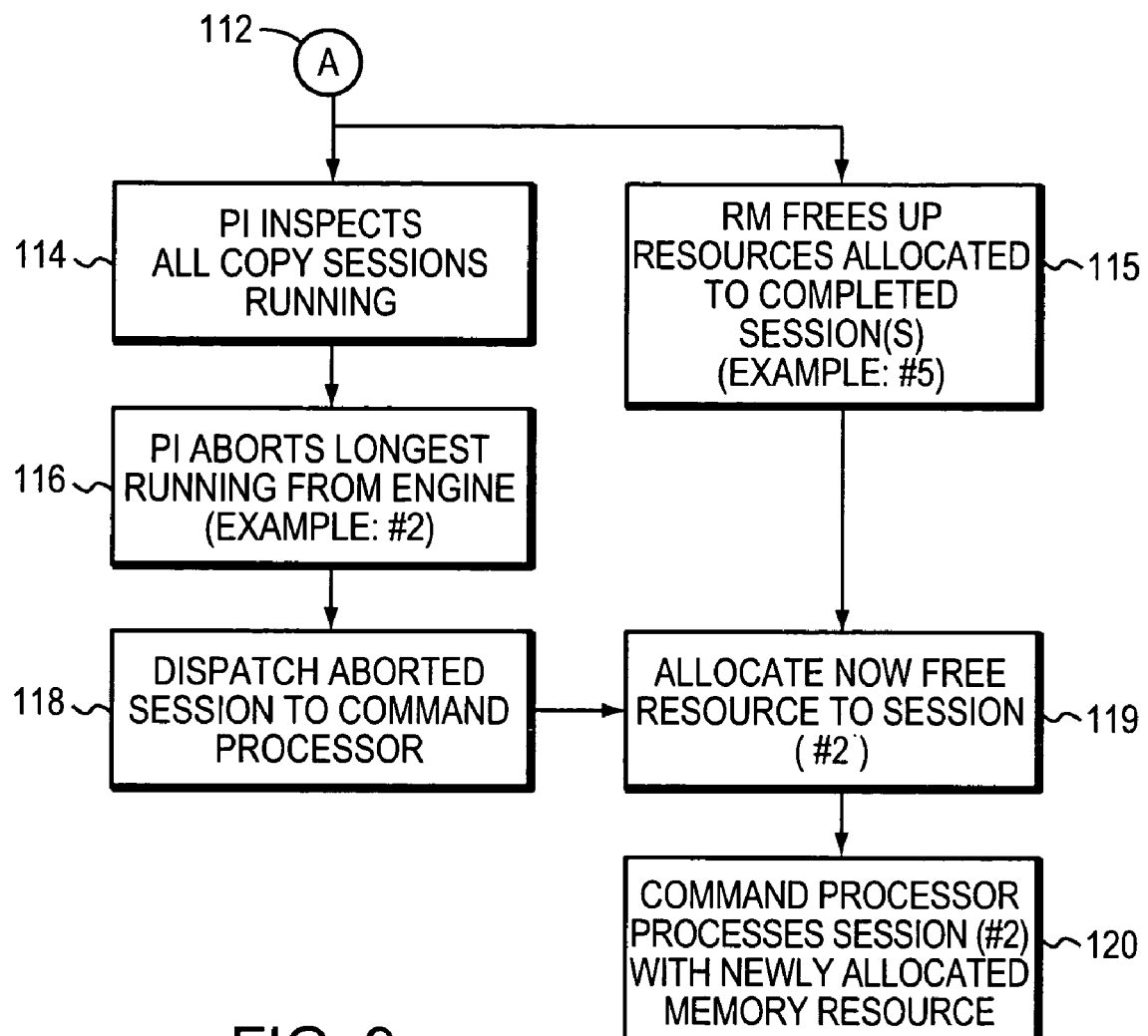
FIG. 9 shows a continuation of the example of FIG. 8.

Referring to FIGS. 8 and 9, a performance management method enabled by embodiments of this invention is described, and reference is made to the preferred embodiment of Mirrorview/A. One skilled in the art will recognize the applicability to other environments, and the invention is therefore only to be limited by the claims and their equivalents. To increase performance the Copy Manager driver will investigate all the Mirrorview/A copy sessions on completion of each Mirrorview/A session, if there are no new Mirrorview/A sessions to start. The driver will scan through all the Mirrorview/A sessions in progress to find the session that's running with relatively lowest memory to its preferred amount of memory. It will then abort that copy session and attempt to restart again with the preferred amount of memory. If it fails due to inadequate memory it will restart with available amount of memory, which should be more that what it was running before).

FIG. 8 describes an example case wherein, in step 100, copy session #2 is started with less than preferred resources required for optimal performance, due to unavailability of resources. Then in step 102, copy session #2 and #5 run in the copy engine. Once a copy session completes as shown in step 104, the copy engine parks the session at the docking station for post-processing as shown in step 106. In this example copy session #5 completes the copy and is parked at the docking station for post-processing. In step 106, the docking station invokes the resource manager to free up all the resources of the completed copy. The Performance Inspector (PI) and Resource Manager (RM) run, as shown in respective steps 108 and 110. Processing flows in continuation step 112, marked A for matching with the identical step on FIG. 9, where the method illustrated by example description is continued.

Referring to FIG. 9, in step 114, the PI inspects all the copy sessions currently running in the copy engine for session running with less than preferred memory. Then the inspector picks the one with the longest time spent in the copy engine in step 116. In this example copy session #2 has its running aborted by the Copy Manager's PI, also shown in step 116. In step 118, the PI then dispatches the aborted copy session #2 to command processor. In step 115, the Command processor calls upon the RM to reallocate preferred resources (now available due to completion of copy session #5) for the copy session #2. The resource is allocated in step 119. Then in step 120, the command processor dispatches the copy session #2 with newly allocated preferred resources to copy engine to resume the copy process, thus increasing the performance of copy session #2.

Figure 10:
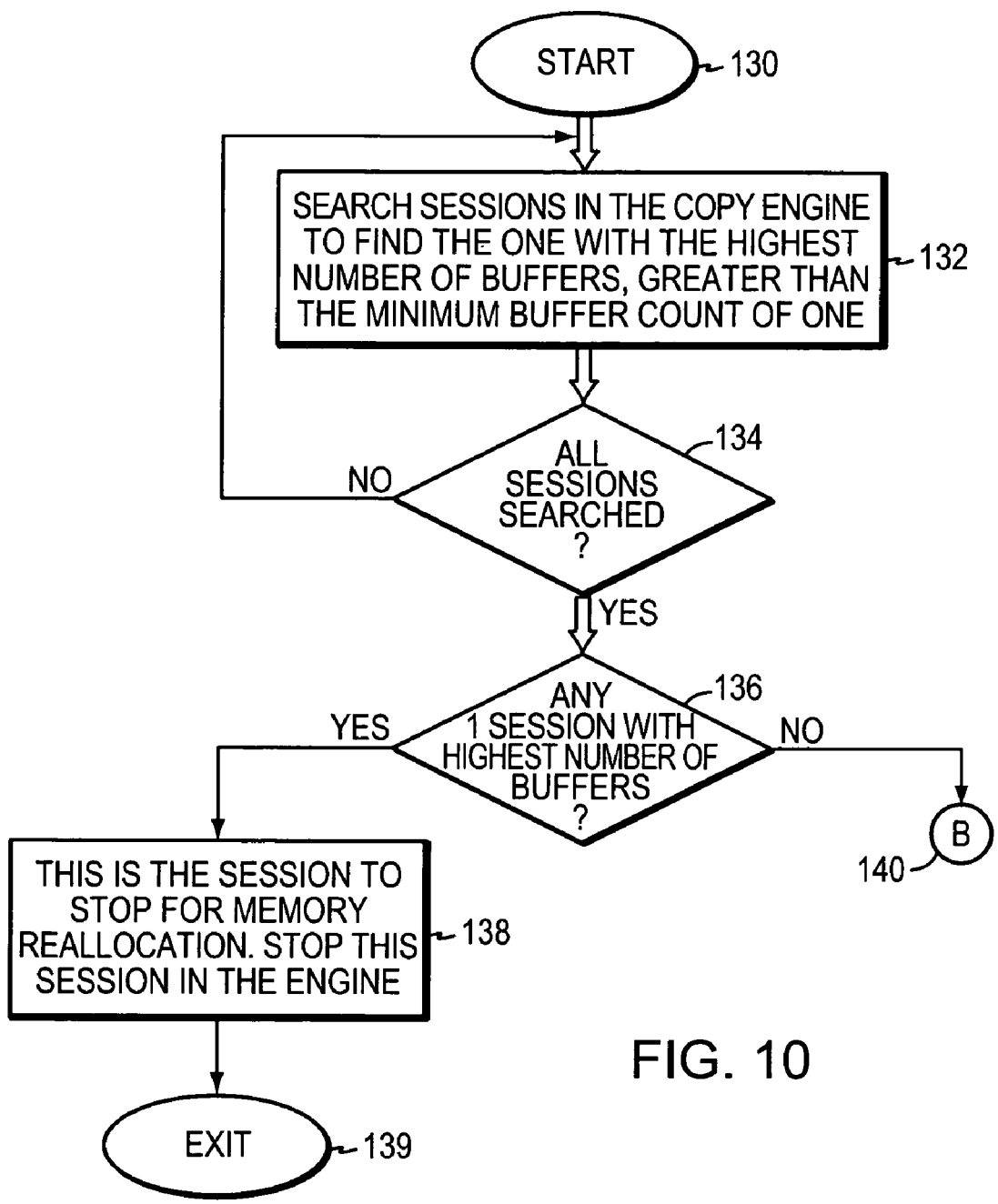
FIG. 10 shows a flow logic diagram of steps for carrying out other method embodiments of the present invention employed by the copy manager.
Figure 11:
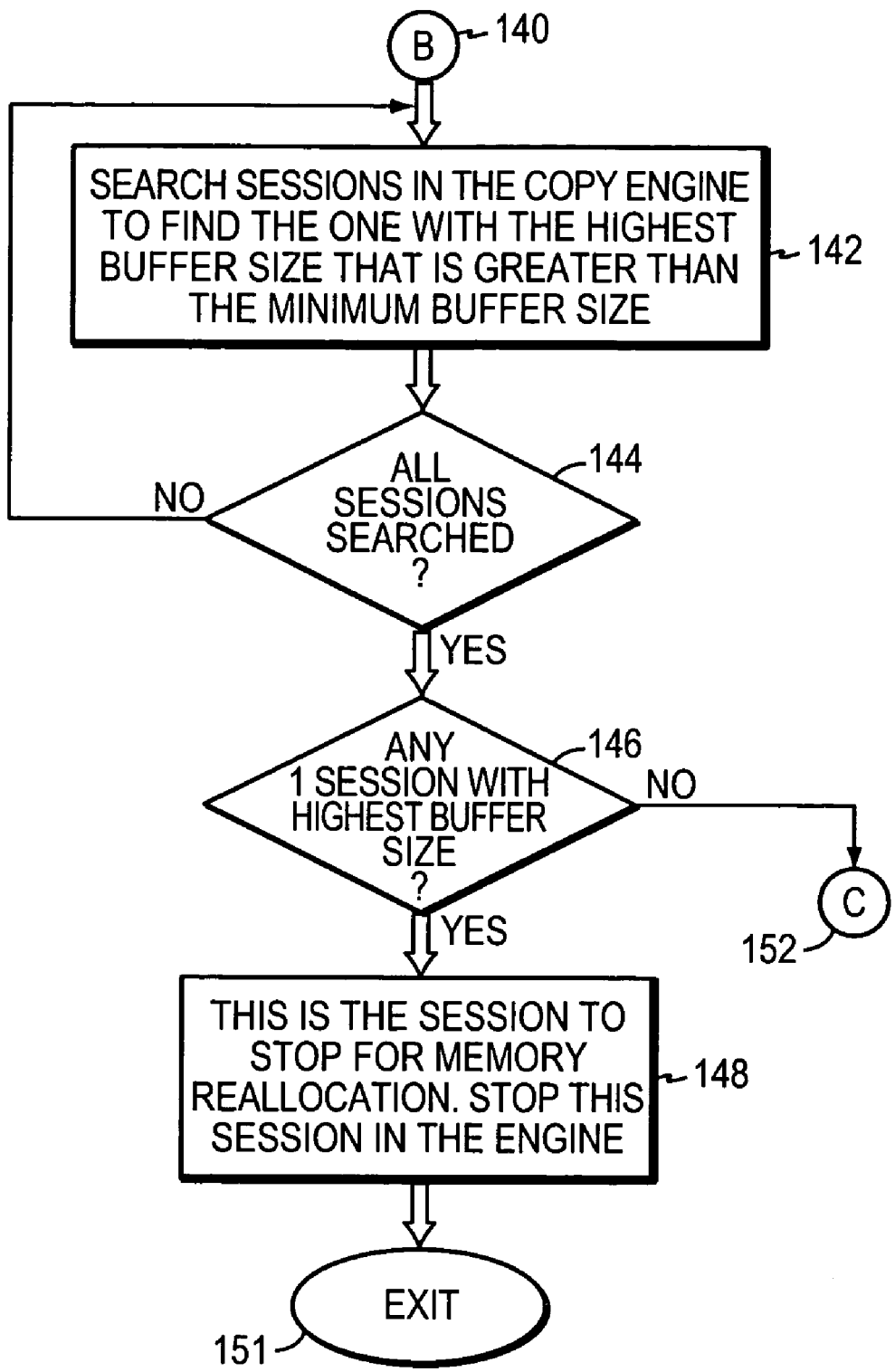
FIG. 11 shows another flow logic diagram of steps for carrying out additional steps of the method embodiment shown in FIG. 10.
Figure 12:
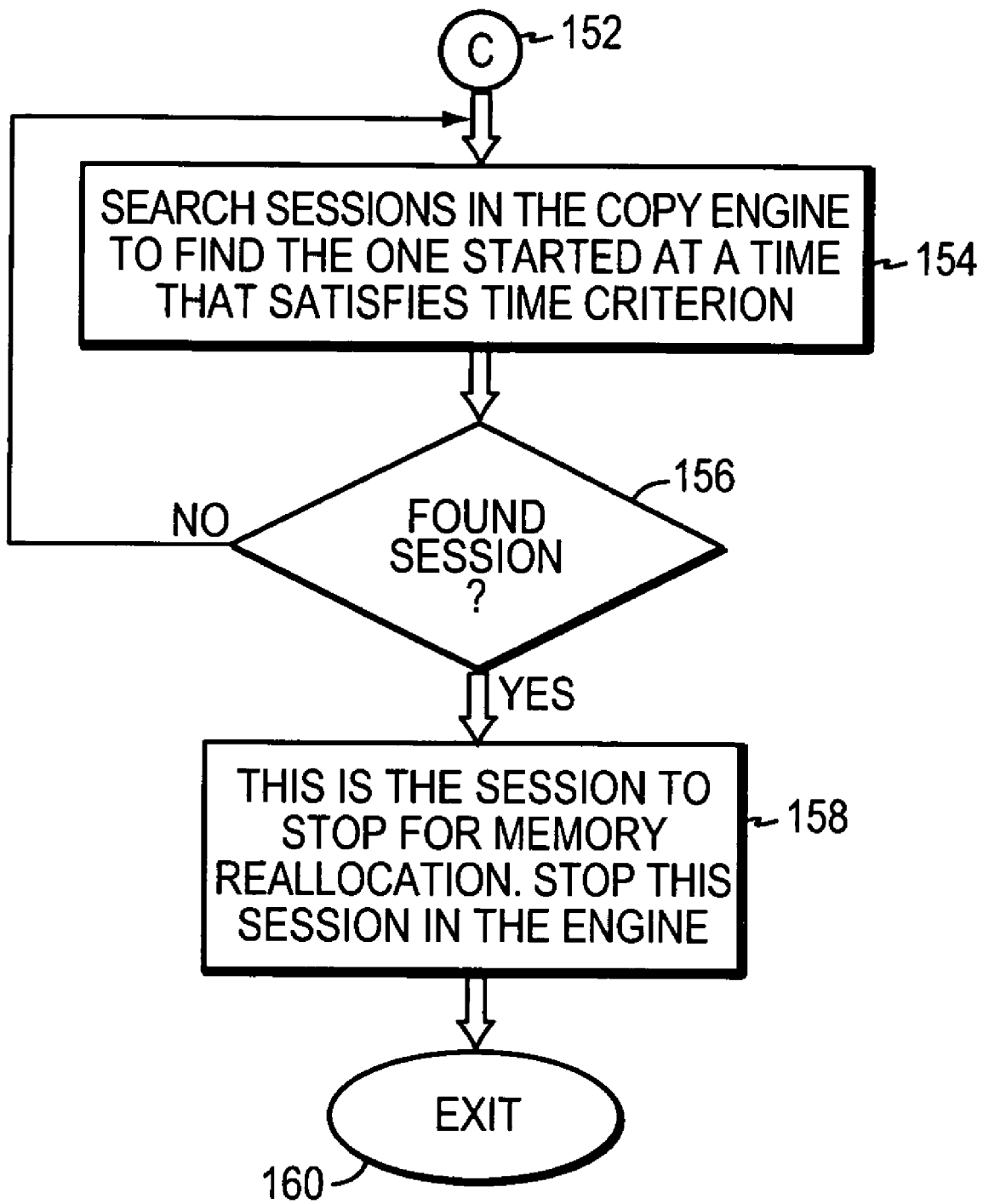
FIG. 12 shows another flow logic diagram of steps for carrying out additional steps of the method embodiment shown in FIG. 10 and also in FIG. 11.

FIGS. 10-12 show steps of a method embodiment that is employed by the copy manager and is useful for further managing sessions and memory management, including reallocation of memory resources. An example is described to illustrate the methodology and in which the preferred Mirrorview/A sessions are described; however, the invention is not limited to such an embodiment but is useful in replication and copying situations where memory and sessions may be managed. An overview of the example follows below.

When the Copy Manager driver cannot get enough memory to start a new Mirrorview/A session, it shall attempt to start the new session with the minimum amount of memory. If the minimum amount is also not available then it will need to abort an executing Mirrorview/A session to free up some memory. The session to be aborted will be the one with maximum amount of memory and be chosen using the following criteria. This is to ensure fairness to the other Mirrorview/A sessions that are currently running by trying to avoid stopping the same session over and over again. Hence the sessions will be stopped in the following order: (1) the session that's using the highest number of buffers but greater than then the minimum number of buffers; and/or (2) if all the sessions are using the same number of buffers then the session that's using the largest amount of buffer size will be chosen; and/or (3) if there is more than one session matching the above criteria the session that has started (by user) the last amongst them will be chosen. This will ensure fairness amongst all the copies and guarantee that the copy that user started first will finish first Referring to FIG. 10, processing starts in step 130. In step 132, a session operating in the copy engine is searched to find the one with the highest number of buffers and greater than the minimum buffer count of one. This continues until all sessions are searched, satisfying the inquiry in step 134. Then in step 136, a query is posed to identify whether any one session has more buffers than any others. If so, this session is stopped in step 138 and the memory associated with the session is available for re-allocation in step 138 and processing stops or exits in step 139. If not, processing flows to continuation step 140 marked "B" to be matched to the identically numbered and marked step in FIG. 11.

Referring to FIG. 11, after step 140, processing flows to step 142, in which each session in the copy engine is searched to identify the one with the highest buffer size that is greater than the minimum buffer size. This continues until all sessions are searched, satisfying the query in step 144, and in which case processing flows to step 146. If any 1 session has the highest buffer size in step 146, then in that case the session is stopped for memory reallocation in step 148 and processing stops or exits in step 151. If not, then processing flows to continuation step 152 marked "C" to be matched to the identically numbered and marked step in FIG. 11.

Referring to FIG. 12, after step 152, processing flows to step 154, in which each session in the copy engine is searched to identify the one that started that meets a predetermined time criterion, such as the earliest or latest. Each session is searched until one is found in accordance with the query of step 156. Once found, this is the session to stop for memory reallocation. Processing stops at step 160.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a first and second data storage system, and production data being stored on the first data storage system, a method for allocating memory resources for transfer of data across a network link in the data storage environment during a replication of the production data to produce a copy of the production data on the second data storage system, the method comprising the steps of:
   determining whether a first copy session has at least a predetermined amount of memory determined by a number of buffers and a size of each of said buffers to complete in accordance with a predetermined criterion for an amount of memory for a copy session; and
   allowing the first copy session to complete if said memory satisfies said criterion and freeing up memory associated with the session to be allocated for another session.

2. The method of claim 1, further comprising the step of:
   inspecting all copy sessions running after the first copy session has completed to determine which of the running sessions are to be allocated the freed up memory.

3. The method of claim 2, wherein the criteria includes determining whether a running session has less than the predetermined amount of memory.

4. The method of claim 2, wherein the criteria includes determining how long a running session has been running.

5. The method of claim 4, further comprising the step of:
   allocating the memory freed up from the complete session to the longest running session with less than a predetermined amount of memory.

6. The method of claim 1, wherein size of buffers the copy session is using is at least 2 kilobytes.

7. A system for allocating memory resources for transfer of data across a network link in a data storage environment having a first and second data storage system during a replication of a production data that is on a first data storage system to produce a copy of said production data onto a second data storage system, the system comprising:
   the first and second data storage system;
   the network link between the first and second data storage system that is available for data transfer when data is being copied from the first data storage system to the second data storage system;
   a computer operational with the first data storage system, said computer when loaded with computer-executable program code performing the method steps of:
   determining whether a first copy session has at least a predetermined amount of memory determined by a number of buffers and a size of each of said buffers to complete in accordance with a predetermined criterion for an amount of memory for a copy session; and
   allowing the first copy session to complete if said memory satisfies said criterion and freeing up memory associated with the session to be allocated for another session.

8. The system of claim 7, computer-executable program code operational with the first data storage system for further enabling the step of:
   inspecting all copy sessions running after the first copy session has completed to determine which of the running sessions meets criteria to be allocated the freed up memory.

9. The system of claim 8, wherein the criteria includes determining whether a running session has less than the predetermined amount of memory.

10. The system of claim 8, wherein the criteria includes determining how long a running session has been running.

11. The system of claim 10, computer-executable program code operational with the first data storage system for further enabling the step of:
    allocating the memory freed up from the complete session to the longest running session with less than a predetermined amount of memory.

12. The system of claim 7, wherein size of buffers the copy session is using is at least 2 kilobytes.

13. A program product for allocating memory resources for transfer of data across a network link in a data storage environment having a first and second data storage system during a replication of the production data to produce a copy of production data that is on a first data storage system onto a second data storage system wherein the network link between the first and second data storage system is available for data transfer when data is being copied from the first data storage system to the second data storage system, and the program product comprises:
- a computer operational with the first data storage system, which when loaded with computer-executable program code provided by computer-readable medium, enabling the computer to perform the method steps of:
- determining whether a first copy session has at least a predetermined amount of memory determined by a number of buffers and a size of each of said buffers to complete in accordance with a predetermined criterion for an amount of memory for a copy session; and
- allowing the first copy session to complete if said memory satisfies said criterion and freeing up memory associated with the session to be allocated for another session.

14. An apparatus for allocating memory resources for transfer of data across a network link in a data storage environment including a first and second data storage system during a replication of production data from a first data storage system to produce a copy of the production data on a second data storage system, wherein the network link between the first and second data storage system is available for data transfer when data is being copied from the first data storage system to the second data storage system, the apparatus comprising:
- means for determining whether a first copy session at least a predetermined amount of memory determined by a number of buffers and a size of each of said buffers to complete in accordance with a predetermined criterion for an amount of memory for a copy session; and
- means for allowing the first copy session to complete if said memory satisfies said criterion and freeing up memory associated with the session to be allocated for another session.

* * * * *